US007860801B2

(12) United States Patent
Manchala (10) Patent No.: US 7,860,801 B2
(45) Date of Patent: Dec. 28, 2010

(54) TOOLS FOR ACCESSING DIGITAL WORKS (75) Inventor: Daniel W. Manchala, Torrance, CA (US)

(73) Assignee: Xerox Corporation, Norwalk, CT (US)

( * ) Notice: Subject to any disclaimer, the term of this patent is extended or adjusted under 35 U.S.C. 154(b) by 1243 days.

(21) Appl. No.: 11/174,943

(22) Filed: Jul. 5, 2005

(65) Prior Publication Data

US 2007/0011094 A1    Jan. 11, 2007

(51) Int. Cl.
*G06F 21/00*    (2006.01)
*G06Q 30/00*    (2006.01)
(52) U.S. Cl. .............................. 705/53; 705/26; 705/51; 705/54
(58) Field of Classification Search .............. 705/1–79
See application file for complete search history.

(56) References Cited

U.S. PATENT DOCUMENTS

| 5,629,980 | A | * | 5/1997 | Stefik et al. ................... 705/54 |
| 5,634,012 | A | | 5/1997 | Stefik et al. |
| 5,715,403 | A | | 2/1998 | Stefik |
| 6,236,971 | B1 | | 5/2001 | Stefik et al. |
| 6,519,700 | B1 | | 2/2003 | Ram et al. |
| 2003/0009423 | A1 | * | 1/2003 | Wang et al. ................... 705/51 |
| 2003/0225700 | A1 | * | 12/2003 | Lao et al. ...................... 705/51 |
| 2004/0024652 | A1 | * | 2/2004 | Buhse et al. .................. 705/26 |

OTHER PUBLICATIONS

Daniel W. Manchala, "Electronic Commerce Trust Models and Metrics," IEEE Internet Computing, pp. 35-43, Mar./Apr. 2000.

* cited by examiner

*Primary Examiner*—Andrew J. Fischer
*Assistant Examiner*—Murali Dega
(74) *Attorney, Agent, or Firm*—Miele Law Group PC (57) ABSTRACT In accordance with one embodiment, apparatus are provided that comprise a user interface, a rendering device, a clearinghouse communicator, and an enable mechanism. The user interface includes a digital work choosing mechanism to choose a digital work for rendering. At least one repository holds digital works and includes the chosen digital work. The rendering device obtains a representation of the chosen digital work from the repository and renders the chosen digital work. A clearinghouse communicator electronically sends rights criteria to a remote clearinghouse and receives rights defining information from the clearinghouse. The enable mechanism enables the rendering device to render the chosen digital work in accordance with the rights defining information.

24 Claims, 4 Drawing Sheets

TOOLS FOR ACCESSING DIGITAL WORKS

One or more aspects of the present disclosure may relate to systems and methods for managing access to digital works.

BACKGROUND

Media distribution continues to spread and evolve, e.g., because of the Internet. Many types of media, for example, journal articles, software, image data, and audio files, can be obtained through landline or wireless networks (including over the Internet). Yet it is still difficult for media users to obtain certain digital works, while it is also difficult for digital work owners to sell and control such works. For example, with a Google search, a list of references may be identified; however, many of those references will only be available (with the appropriate copyright clearance) if the user obtains and pays for a yearly subscription with a specific publisher. Having subscriptions with all necessary publishers is not practical.

BRIEF SUMMARY

In accordance with one embodiment, apparatus are provided that comprise a user interface, a rendering device, a clearinghouse communicator, and an enable mechanism. The user interface includes a digital work choosing mechanism to choose a digital work for rendering. At least one repository holds digital works and includes the chosen digital work. The rendering device obtains a representation of the chosen digital work from the repository, and renders the chosen digital work. A clearinghouse communicator electronically sends rights criteria to a remote clearinghouse and receives rights defining information from the clearinghouse. The enable mechanism enables the rendering device to render the chosen digital work in accordance with the rights defining information.

BRIEF DESCRIPTION OF THE DRAWINGS

One or more embodiments are further described in the detailed description, which follows, by reference to the noted drawings, and wherein.

DETAILED DESCRIPTION

In embodiments, "user" may be construed to be, e.g., a person or entity that uses another's digital work. An "owner" may be a person or entity who possesses the ownership rights regarding the use, distribution or publication of a certain digital work. The owner may have delegated the authority to distribute or manage rights to another entity, e.g., a clearinghouse.

In embodiments herein, a "digital work" or "work" may, e.g., include digital information including, e.g., an audio, video, text, or multimedia composition. In embodiments, a digital work or work may further include data, a program, or an interpreter necessary to access the work. In embodiments, a digital work may be a collection of digital works. In embodiments herein, a work is "digital" when, for example, it is electronically represented and electronically storable or portable, e.g., because it has been digitally sampled or formatted in a computer-readable file or object.

In embodiments herein, a "computer system" may be e.g., an individual computer or a network of individual computers (e.g., laptops, desktops, workstations, etc.) with appropriate operating systems and application programs, or it may be any combination or portion of such computer mechanisms.

Figure 1:
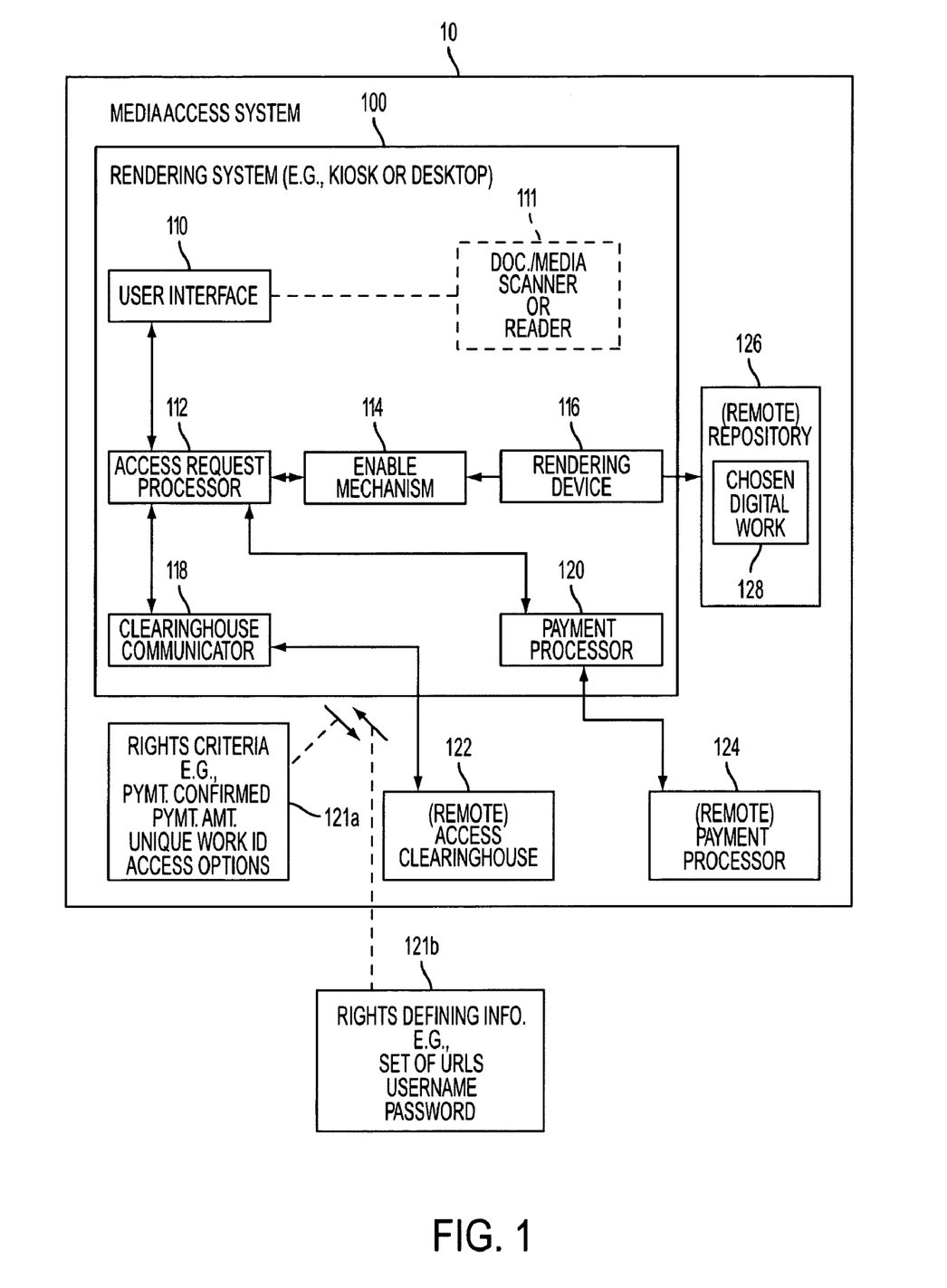
FIG. 1 is a schematic block diagram of a media access system.

Referring now to the figures in greater detail, FIG. 1 illustrates a block diagram of a media access system 10. The illustrated media access system 10 includes a rendering system 100, a remote repository 126, a remote access clearinghouse 122, and a remote payment processor 124. While each of elements 126, 122 and 124 is indicated as being remote, such elements may be provided locally to the rendering system 100.

The illustrated rendering system 100 may be, for example, a kiosk or a desk top computer, provided, for example, in a library, bookstore, or at some other central location.

The illustrated rendering system 100 includes a user interface 110, an access request processor 112, and enable mechanism 114, and a rendering device 116. The rendering system 100 further includes a clearinghouse communicator 118 and a payment processor 120.

The user interface includes a digital work choosing input to receive, through human input via an interface, a chosen digital work for rendering. As shown in FIG. 1, the chosen digital work 128 is stored in a repository 126. In the illustrated embodiment, repository 126 is remote from rendering system 100. Repository 126 may include, for example, a database accessible through a web server accessed by rendering device 116. Repository 126 may include an extensive or limited collection of digital works not specifically shown in FIG. 1. In addition, the illustrated media access system 10 may include a plural set of rendering systems 100. Moreover, one or more access clearinghouses 122, payment processors 124 and repositories 126 may exist as part of system 10.

Rendering device 116 is provided to obtain a representation of the chosen digital work 128 from repository 126, and to render the obtained representation. That rendering may be performed, for example, by printing a document at the rendering system's 100 locale, or by storing any type of multimedia digital work local to rendering system 100 or on a portable memory device temporarily coupled to rendering system 100. In addition, rendering device 116 may obtain a representation of a work, typically a file, and render it by downloading the file to a customer's e-book in communication with the rendering system 100.

Should the customer have a personal digital assistant (PDA) or a laptop, such a device could be in communication with rendering system 100, for example, using wireless data exchange technology, and rendering system 100 could send the requested chosen digital work 128 file to such a device for storage therein and subsequent use by the customer. Should the customer simply wish to have a print-out of the chosen digital work 128, where the chosen digital work 128 is a document such as a journal article, a rendering device 116 can simply print the item.

User interface 110 may include a document or media scanner or reader 111. If the media is a document, that document may be provided with a unique work ID (an ISBN number, related information, and/or other information serving to uniquely identify the work) uniquely identifying the work. Such an ID may include, for example, the name of the author, the title, the publishing company, the date of publication, and the range of pages of the publication. In addition, such a document may further be provided with a bar code, glyph, or RFID chip located, for example, in a lower right-hand corner of the top page of the requested document. In this instance, a customer may obtain a physical copy or visible representation of a desired document, for example, at a library or a book store, and use a scannable or readable mechanism provided on the document itself to indicate to rendering system 100 the specific identification of that document. If the document is complete, and the customer has it in his or her hand, the scanner or reader 111 may include a photocopy scanning device to facilitate the photocopying or another type of scanning of the document for reproduction, so that the customer can obtain a copy of the document at rendering system 100.

Device 111 may also include a flatbed scanner, a copy machine, a multifunctional device, or a digital, magnetic, RF, or optical scanning or reading device. It may also include a pen-type scanner or reader.

Rendering device 116 may be implemented to render a given digital work in one or plural forms, including by way of example one or more of printing, faxing, forming a image file such as Adobe Acrobat PDF document, and/or emailing the same to the customer's designated e-mail address. In addition, rendering device 116 may, for example, burn a CD or otherwise save a given digital work to a portable memory device in communication with rendering system 100.

Access request processor 112 processes each access request for a given customer, and interacts with enable mechanism 114, clearinghouse communicator 118, and payment processor 120, among other possible elements not specifically shown in FIG. 1. Clearinghouse communicator 118 electronically sends rights criteria 121*a* to a remote access clearinghouse 122, and receives rights defining information 121*b* from access clearinghouse 122. As shown in FIG. 1, rights criteria 121*a* may comprise, for example, payment confirmation information, payment amount information, a unique work ID identifying the work chosen by the customer, and a set of access options. Rights defining information 121*b* may comprise, for example, a set of URLs (links to web servers via the world wide web over the Internet), a user name/password set for use by the customer directly, or a user name/password set for use by access request processor 112 using a process that is not seen by the customer, to access works via enable mechanism 114 and rendering device 116.

Rights defining information 121*b* may also include a copyright clearance code to authorize the use of a chosen work for a particular purpose. The code could be incorporated into works using the cleared work, either visibly or invisibly accompanying, e.g., a derivative work.

Enable mechanism 114 enables rendering device 116 to render the chosen digital work 128 in accordance with the rights defining information 121*b* received by clearinghouse communicator 118 in response to sent rights criteria 121*a* corresponding to the chosen digital work 128.

Enable mechanism 114 grants rendering device 116 access to chosen digital work 128 for rendering, e.g., printing a hard copy of chosen digital work 128. This may be achieved by providing rendering device 116 with a private key to unlock the encryption of the chosen digital work 128. Chosen digital work 128 may be sent from repository 126 via a direct connection or by disclosing the IP address/location of chosen digital work 128.

Clearinghouse communicator 118 may consult other sources to populate the rights criteria With other information required by access clearinghouse 122 to decide whether access should be granted, e.g. credit card history or a trust index rating. Alternatively, clearinghouse 122 may itself consult other sources, e.g., to obtain similar information. In other embodiments, information not related to the user may also be disclosed as well; such as information about the site, e.g., distributor or bookstore, where system 10 is located.

For purposes of authentication and security, access request processor 112 may attach a digital signature unique to the customer, unique to the site of access system 10, and/or unique to an authority that inspects and certifies system 10. A digital signature includes data which accompanies a digitally encoded message, and can be used to ascertain the source of the message and to confirm that the message has not been modified since leaving the ascertained source.

To ensure security of the request throughout the transaction, the illustrated embodiment may implement a suitable public key infrastructure (PKI) for purposes of authentication and authorization. Other secure identification methods may also be implemented for purposes of authorization and authentication; e.g., private keys and cryptographic protocols. These security and verification methods can be multi-leveled and involve additional parties.

Access clearinghouse 122 may include, or be in direct communication with, an owner or publisher computer system which allows an author or other rights owner or agent to influence the process including, e.g., by making decisions whether to grant a particular customer access to a work, by making pricing changes, and/or by updating context in repository 126. Pricing changes may be made by access clearinghouse 122 and/or a publisher system for a given customer transaction. For example, if a given customer has a poor trust index rating, the price may be increased.

Payment processor 124 processes payments for transactions. In the illustrated embodiment, payment processor 124 is a financial institution. The transactions involving payment processor 124 can be electronically accomplished using electronic fund transfers or other secure electronic financial transaction mechanisms. However, payment processor 124 may be a debit account or any financially capable system able to transact the appropriate payment.

In the illustrated embodiment, the elements of system 10 are each implemented as a code software program on a general purpose computer. Alternatively, they may be implemented as a special purpose computing mechanism or any hardware computing mechanism or portion thereof capable of performing the described functions.

Figure 2:
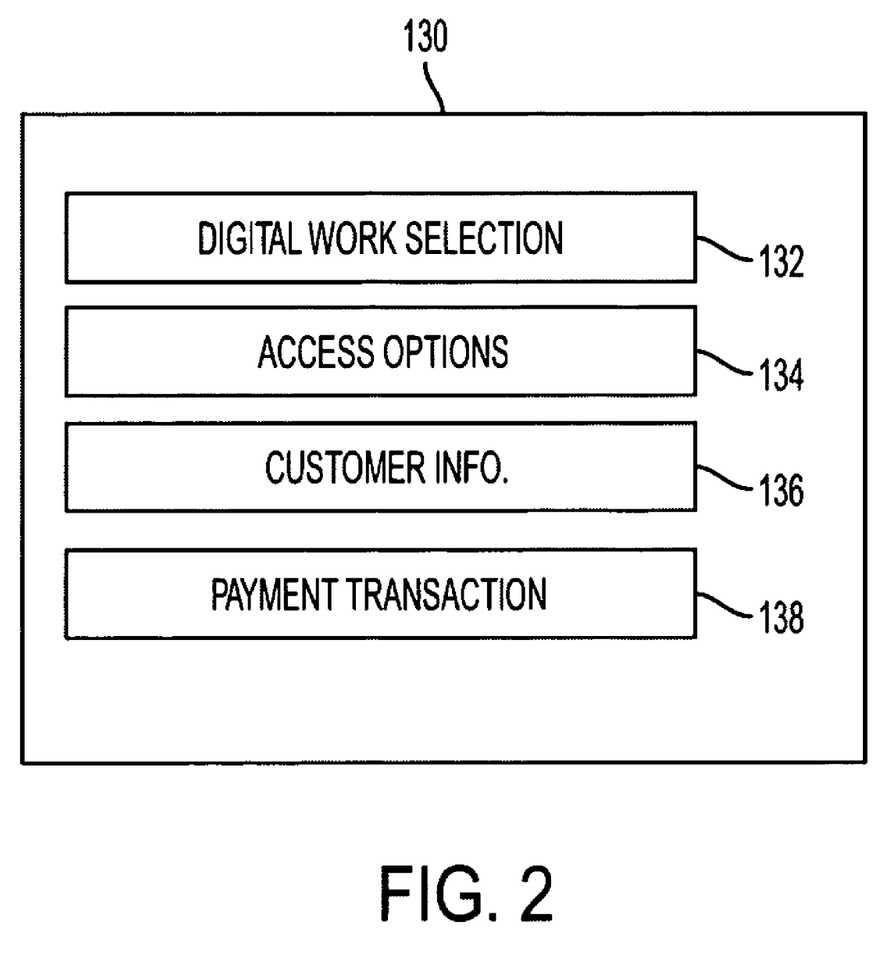
FIGS. 2 and 3 are schematic block diagrams of user interfaces of the illustrated access system.

FIG. 2 is a schematic illustration of a user interface 130 of an access system. In the illustrated embodiment, user interface 130 includes a digital work selection interface 132, an access options interface 134, customer information interface 136, and a payment interface 138. Each of the interfaces shown in FIG. 2 includes one or a combination of input/output tools. An input/output tool may, for example, include an icon or button that can be activated by clicking a mouse with a cursor situated over the icon or button. An input/output tool may include a form of textual input represented on a computer screen. An input/output tool may include a menu or displayed symbols or text that could be chosen by pointing to and clicking over a given symbol or text. The input/output tool can also include a drop down menu or any other type of graphical tool. Alternatively, other tools may be provided to allow a user to control and operate the user interface 110 including scanners and reading devices.

Digital work selection interface 130 may include input/output tools to allow the customer to select the digital work to be rendered. A browse function may be included to allow the user to browse files through a file management system to select the digital work to be rendered.

Figure 3:
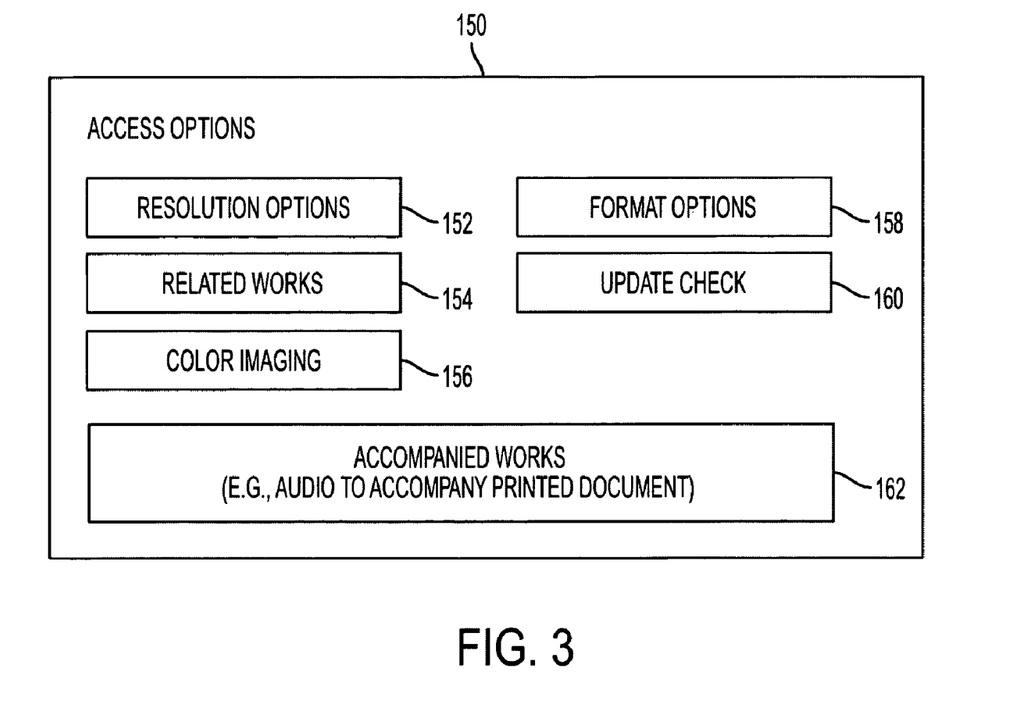

Access options interface 134 (an example of which is shown in FIG. 3 and described in more detail below) may include input/output tools to allow the customer to select the type of access he or she desires to a chosen digital work, e.g., specific pages or certain chapters.

Customer information interface 136 may include input/output tools to allow the user to provide system 10 with information about him or herself. The customer information may include the user's name, address, and credit card information. Other embodiments may require additional information. Customer information may also be obtained by inserting a card or identifying mechanism that already contains information about the customer into system 10. In addition, for purposes of authentication and security, the customer may also choose to insert his or her digital signature.

Payment transaction interface 138 may include input/output tools to allow the customer to choose pricing options and to effect payment for the work.

FIG. 3 is a schematic diagram of an access options interface 150. The elements shown in FIG. 3 are input/output tools as described above. The illustrated interface 150 includes a resolution options interface 152, a related works interface 154, a color imaging interface 156, a format options interface 158, an update check interface 160, and an accompanied works interface 162.

The illustrated resolution options interface 152 includes one or more input/output tools to allow a customer to indicate the level of resolution of a chosen work. For example, a chosen work may be available in a poor or low resolution at a library or a bookstore (e.g., copied using a low resolution optical scanner or copy machine) at which the illustrated media access system 10 is provided. In this case, the customer can simply choose to obtain a copy of the work using the rendering system 100 at the lower resolution, or through the use of related works interface 154, the customer can choose a higher resolution. If the customer chooses a higher resolution, the customer may be presented with pricing options by payment transaction interface 138 to allow the customer to pay more for the higher resolution version of the work.

Related works interface 154 includes one or more input/output tools, and allows a customer to identify any works that may be related to the chosen work, in addition to the rendering of the chosen work. Color imaging interface 156 allows a customer to choose a work to include color imaging in the rendered version. For example, some works might include images, and those images can be reproduced in either a grey image or a color image. An option, for example, may be the type of paper, e.g., glossy or heavier stock. The customer may whether or not color imaging is included in the rendered work through color imaging interface 156.

Format options interface 158 may be provided to allow a customer to indicate the format in which the work is to be rendered. By way of example, the format options interface may include input/output tools to allow a customer to indicate that the work is to be rendered in a printed format, an audio format, a visual format, or in a video format. Other options might include the rendering of a printed document in an Adobe Acrobat PDF format or in a word document format. In addition, for software, a customer might choose the code's source code and one of a set of selectable programming languages and/or its corresponding executable code or library.

Update check interface 160 includes input/out tools to allow a customer to request, through an online access of the illustrated rendering system 100, whether there are any updates available pertaining to the chosen work. For example, if the chosen work is a technical journal article, information may be provided to update the information provided in the present version of the journal article of which the customer is aware. Should the work be software alone or software accompanying a given chosen work, the customer can indicate that he or she desires a check to be performed to determine if there are any updates to that software. Such an inquiry can be performed through the use of update check interface 160.

Accompanied works interface 162 includes one or more input/output tools to allow a customer to identify and purchase or otherwise request any works that accompany the chosen work. For example, some printed documents may include audio documents that accompany the work, images, video clips, or scientific data. Any one of those accompanying items may be identified and selected through the use of accompanied works interface 162. Accompanied work identifying information may be stored locally or may be accessible by communicating with access clearinghouse 122, e.g., in connection with a given primary work identified by the customer and sent in rights criteria 121a.

Figure 4:
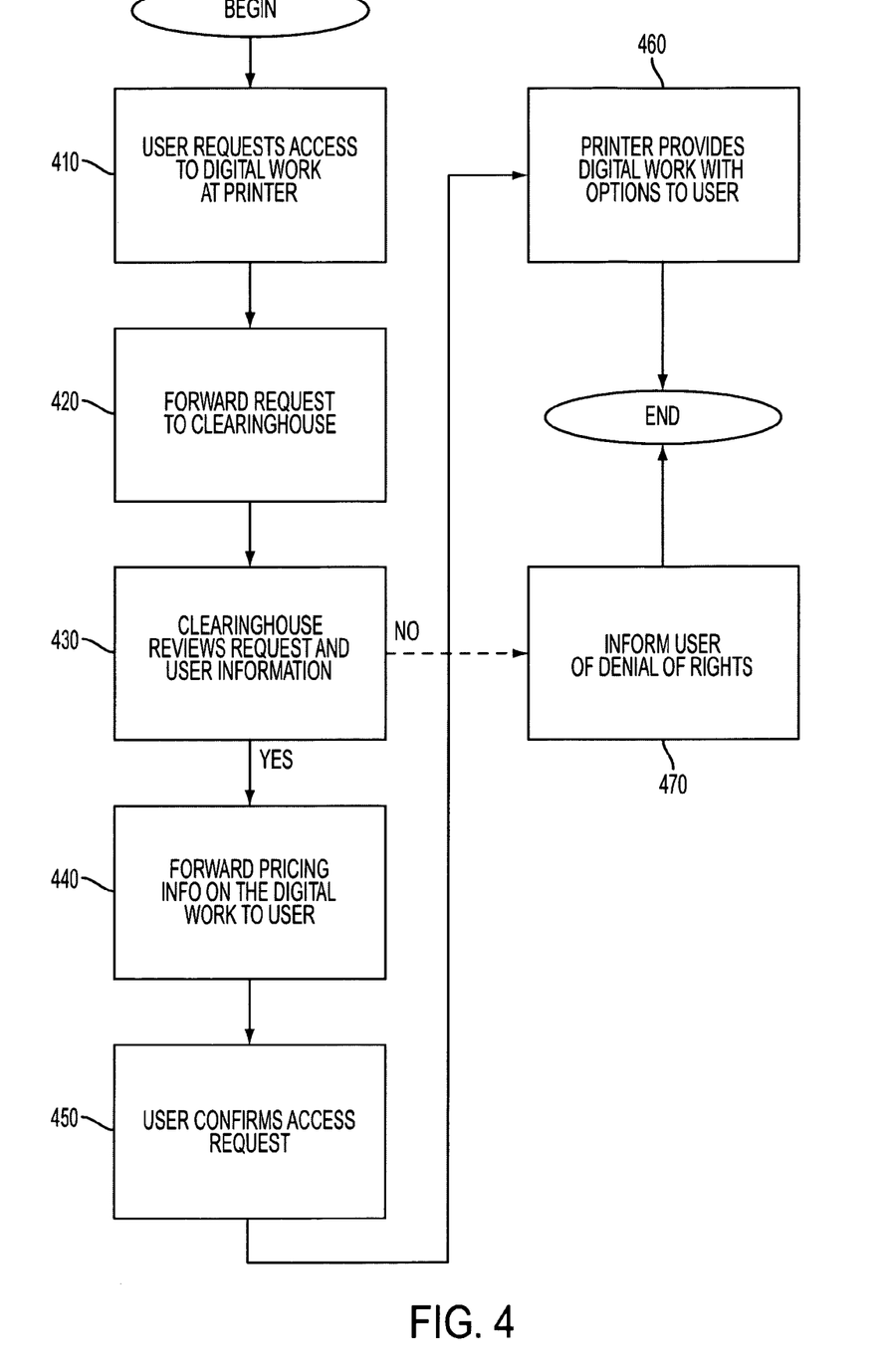
FIG. 4 is a flow diagram of a digital work access process.

FIG. 4 is a general flowchart of a process by which a customer requests a rendering of a digital work using a media access system. In the illustrated embodiment, system 10 is a printer system. The process begins in act 410 where the customer requests access to a chosen digital work at the printer system. As part of act 410, the customer also provides customer information in this embodiment. The customer information may include the customer's name and credit card information. Other customer information may be required in other embodiments.

In a next act 420, the printer system forwards the request and customer information from the customer to the clearinghouse system. As part of the customer information forwarded to the clearinghouse system, the printer system may include a trust index rating or credit score information for the customer, e.g., obtained by consulting another remote database (not shown). Additional information may be required in other embodiments. For example, the process may require including information about the location from which the customer is requesting the digital work, e.g., the specific bookstore or library, to determine whether the location is an authorized site.

In a next act 430, the clearinghouse system reviews the request and the customer information. Based upon the request and customer information, the clearinghouse system renders a decision. If the request is denied, the clearinghouse system forwards a request denied message to the customer via the printer system in an act 470.

If the request is granted, the clearinghouse system forwards the pricing information for the available access to the requested digital work to the customer via the printer system in an act 440. In a next act 450, the customer confirms or modifies his or her request for certain access upon receipt of the pricing information from the clearinghouse system. The printer system's payment processor forwards the payment transaction to the remote payment processor for payment once access is confirmed. Upon confirmation, in a final act 460, the printer system renders the chosen digital work in the desired format and with the desired access options to the customer.

The processing or functions performed by the elements described above may be performed by a general purpose computer and/or by a specialized processing computer. Such processing or functions may be performed by a single platform or by a distributed processing platform. In addition, such processing or functions can be implemented in the form of special purpose hardware or in the form of software run by a computer. Any data handled in such processing or created as a result of such processing can be stored in any type of memory. By way of example, such data may be stored in a temporary memory, such as in the RAM of a given computer.

In addition, or in the alternative, such data may be stored in longer-term storage devices, for example, magnetic disks, rewritable optical disks, and so on. For the disclosure herein, machine readable media comprise any form of data storage mechanism, including the above-noted different memory technologies as well as hardware or circuit emulations of such structures and of such data.

The claims as originally presented and as they may be amended, encompass variations, alternatives, modifications, improvements, equivalents and substantial equivalents of the embodiments and teachings disclosed herein, including those that are presently unforeseen or unappreciated, and that, for example, may arise from applicants/patentees and others.

What is claimed is:

1. Apparatus comprising:
   a customer interface at a rendering site, the customer interface including a digital work choosing input configured to receive, through human input at the rendering site via an interface at the rendering site, a chosen digital work for rendering at the rendering site;
   a rendering device at the rendering site, the rendering device being configured to obtain a representation of the chosen digital work from at least one repository holding digital works including the chosen digital work, and being configured to render the obtained representation, wherein the at least one repository is remote from the rendering site;
   a secure clearinghouse communicator configured to electronically send rights criteria to a remote clearinghouse remote from the rendering site, and configured to receive rights defining information from the clearinghouse, wherein the rights criteria include corresponding rights criteria corresponding to the chosen digital work, the corresponding rights criteria including a unique work identifier, and wherein the rights defining information is in response to the corresponding rights criteria and includes a set of links to web servers and a username/password set for use by the customer to access the chosen work; and
   an enable mechanism configured to enable the rendering device to render the obtained representation of the chosen digital work in accordance with the rights defining information received by the clearinghouse communicator in response to the corresponding rights criteria corresponding to the chosen digital work.

2. The apparatus according to claim 1, wherein the customer interface includes a media reader configured to read unique media identifying information from a representation of desired media thereby inputting the chosen digital work.

3. The apparatus according to claim 2, wherein the media reader comprises a bar code reader.

4. The apparatus according to claim 2, wherein the media reader comprises one of a glyph reader and an RFID reader.

5. The apparatus according to claim 1, wherein the rights criteria sent to the remote clearinghouse include access options specified by a customer through the customer interface.

6. The apparatus according to claim 1, wherein the rendering device includes a printer, and wherein the rendering device is configured to render the obtained representation by printing the obtained representation.

7. The apparatus according to claim 1, wherein the rendering device includes a printer and a scanner, and wherein the rendering device is configured to render the obtained representation by scanning and reproducing a document.

8. The apparatus according to claim 1, wherein the rendering device includes an e-book writer, and wherein the rendering device is configured to render the obtained representation by writing an e-book.

9. The apparatus according to claim 1, wherein the sent rights criteria includes name and payment information pertaining to a customer requesting the rendering of the chosen digital work via the user interface.

10. The apparatus according to claim 1, wherein the sent rights criteria includes a unique trustworthiness rating of a customer requesting the rendering of the chosen digital work.

11. A method comprising:
   a customer choosing, through human input via an interface at a rendering site, a digital work for rendering at a rendering device at the rendering site;
   electronically sending rights criteria to a remote clearinghouse remote from the rendering site, wherein the rights criteria include corresponding rights criteria corresponding to the chosen digital work, the corresponding rights criteria including a unique work identifier;
   receiving rights defining information from the remote clearinghouse, wherein the rights defining information is in response to the corresponding rights criteria and includes a set of links to web servers and a username/password set for use by the customer to access the chosen work;
   permitting the rendering device to render the chosen digital work in accordance with the rights defining information; and
   the rendering device rendering the chosen digital work when permitted.

12. The method according to claim 11, further comprising:
   electronically purchasing the rendering of the chosen digital work.

13. The method according to claim 12, wherein the rights defining information confirms whether a customer is to be provided with access to the chosen digital work.

14. The method according to claim 11, wherein the sent rights criteria includes name and payment information pertaining to a user requesting the rendering of the chosen digital work.

15. The method according to claim 11, wherein the sent rights criteria includes a trustworthiness rating of a user requesting the rendering of the chosen digital work.

16. Machine-readable media encoded with data, the data being interoperable with a machine to cause:
   choosing a digital work for rendering at a rendering device;
   electronically sending rights criteria to a remote clearinghouse remote from the rendering site, wherein the rights criteria include corresponding rights criteria corresponding to the chosen digital work, the corresponding rights criteria including a unique work identifier;
   receiving rights defining information from the remote clearinghouse, wherein the rights defining information is in response to the corresponding rights criteria and includes a set of links to web servers and a username/password set for use by the customer to access the chosen work;
   permitting the rendering device to render the chosen digital work; and
   rendering the chosen digital work.

17. The machine-readable media according to claim 16, the data being interoperable with a machine to cause:
   electronically purchasing the rendering of the chosen digital work.

18. The apparatus according to claim 1, wherein the rights criteria include access options specified by a customer through the customer interface.

19. The apparatus according to claim 5, wherein the customer interface is configured to accept customer specified access options, including resolution options for the chosen work, thereby allowing the customer to indicate, via the customer interface, a level of resolution for the chosen work.

20. The apparatus according to claim 5, wherein the customer interface is configured to accept customer specified access options, including related works related to the chosen work, thereby allowing the customer to identify, via the customer interface, works related to the chosen work to also be rendered by the rendering device.

21. The apparatus according to claim 5, wherein the customer interface is configured to accept customer specified access options, including color imaging options, thereby allowing the customer to specify, via the customer interface, that the rendered version of the chosen work shall include color imaging.

22. The apparatus according to claim 5, wherein the customer interface is configured to accept customer specified access options, including format options, thereby allowing the customer to specify, via the customer interface, a format in which the chosen work is to be rendered.

23. The apparatus according to claim 5, wherein the customer interface is configured to accept customer specified access options, including update check options, thereby allowing the customer to request, via the customer interface, information about any updates of the chosen work.

24. The apparatus according to claim 5, wherein the customer interface is configured to accept customer specified access options, including accompanying works options, thereby allowing the customer to choose for rendering, via the customer interface, works accompanying the chosen work.

\* \* \* \* \*

UNITED STATES PATENT AND TRADEMARK OFFICE
CERTIFICATE OF CORRECTION

| | | |
|---|---|---|
| PATENT NO. | : 7,860,801 B2 | Page 1 of 1 |
| APPLICATION NO. | : 11/174943 | |
| DATED | : December 28, 2010 | |
| INVENTOR(S) | : Manchala | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1288 days.

Signed and Sealed this
Eleventh Day of October, 2011

David J. Kappos
*Director of the United States Patent and Trademark Office*